US012583442B2

(12) United States Patent
Hidaka et al.

(10) Patent No.: US 12,583,442 B2
(45) Date of Patent: Mar. 24, 2026

(54) RELAY DEVICE, DATA RELAY METHOD, AND STORAGE MEDIUM STORING DATA RELAY PROGRAM

(71) Applicant: DENSO CORPORATION, Kariya-city (JP)

(72) Inventors: Takamasa Hidaka, Kariya-city (JP); Kodai Yamaura, Kariya-city (JP); Masatake Wada, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 235 days.

(21) Appl. No.: 18/169,485

(22) Filed: Feb. 15, 2023

(65) Prior Publication Data

US 2023/0182719 A1     Jun. 15, 2023

Related U.S. Application Data

(63) Continuation of application No. PCT/JP2021/029524, filed on Aug. 10, 2021.

(30) Foreign Application Priority Data

Sep. 30, 2020     (JP) ................................. 2020-165995

(51) Int. Cl.
*B60W 30/06*          (2006.01)
*B60W 60/00*          (2020.01)

(52) U.S. Cl.
CPC .......... *B60W 30/06* (2013.01); *B60W 60/001* (2020.02); *B60W 2556/45* (2020.02)

(58) Field of Classification Search
None
See application file for complete search history.

(56) References Cited

U.S. PATENT DOCUMENTS

| | | | | |
|---|---|---|---|---|
| 2005/0063458 A1* | 3/2005 | Miyake | ................... | H04L 47/10 |
| | | | | 455/67.11 |
| 2019/0217869 A1* | 7/2019 | Takeuchi | ............ | G06F 11/3013 |
| 2020/0204396 A1 | 6/2020 | Kobayashi | | |
| 2020/0324789 A1* | 10/2020 | Ando | ................ | B60W 60/0025 |
| 2020/0387153 A1* | 12/2020 | Noguchi | .............. | G05D 1/0022 |
| 2021/0168219 A1* | 6/2021 | Masuda | .............. | H04L 67/2866 |
| 2021/0269020 A1* | 9/2021 | Kubo | ..................... | G08G 1/146 |

FOREIGN PATENT DOCUMENTS

| | | |
|---|---|---|
| CN | 110574345 A | 12/2019 |
| JP | 2011054116 A | 3/2011 |
| JP | 2018060393 A | 4/2018 |

* cited by examiner

*Primary Examiner* — Jelani A Smith
*Assistant Examiner* — Davin Seol
(74) *Attorney, Agent, or Firm* — Harness, Dickey & Pierce, P.L.C.

(57) ABSTRACT

A parking assist device performs parking assist. A vehicle receives assist from the parking assist device. A type determination unit determines a type of received data, which represents data received from the parking assist device or the vehicle. A replacement transmission unit replaces the received data with at least one transmission data, which is prepared in advance, according to the type of the received data and transmits the transmission data to the receiver device, when the type of the received data is a first type. A transfer unit transfers the received data as the transmission data to the receiver device when the type of the received data is a preset second type.

15 Claims, 9 Drawing Sheets

FIG. 5

AVP FUNCTION ON REQUEST

|  |  | VEHICLE A | VEHICLE B | VEHICLE C |
|---|---|:---:|:---:|:---:|
| MQTT | DOOR LOCK | ◯ |  | ◯ |
|  | IG-ON | ◯ |  | ◯ |
|  | POWER WINDOW CLOSING | ◯ |  | ◯ |
|  | DOOR MIRROR RETRACTION | ◯ |  | ◯ |
|  | HAZARD LAMP OFF | ◯ |  |  |
|  | HEADLIGHT SET TO AUTO | ◯ |  |  |
|  | AIR CONDITIONER OFF | ◯ |  |  |
| WebSocket | DOOR LOCK |  | ◯ |  |
|  | IG-ON |  | ◯ |  |
|  | POWER WINDOW CLOSING |  |  |  |
|  | DOOR MIRROR RETRACTION |  |  |  |
|  | HAZARD LAMP OFF |  | ◯ |  |
|  | HEADLIGHT SET TO AUTO |  | ◯ |  |
|  | AIR CONDITIONER OFF |  | ◯ |  |

RELAY DEVICE, DATA RELAY METHOD, AND STORAGE MEDIUM STORING DATA RELAY PROGRAM

CROSS REFERENCE TO RELATED APPLICATION

The present application is a continuation application of International Patent Application No. PCT/JP2021/029524 filed on Aug. 10, 2021, which designated the U.S. and claims the benefit of priority from Japanese Patent Application No. 2020-165995 filed on Sep. 30, 2020. The entire disclosures of all of the above applications are incorporated herein by reference.

TECHNICAL FIELD

The present disclosure relates to a parking assist device configured to assist parking of a vehicle, a parking assist method performed by the parking assist device, a parking assist system including the parking assist device, and a storage device storing a parking assist program.

BACKGROUND

Conventionally, a parking assist device for guiding an automated vehicle in a parking lot is known.

SUMMARY

According to an aspect of the present disclosure, a relay device is configured to relay data exchanged between a parking assist device, which is configured to perform parking assist, and a vehicle, which is configured to receive assist from the parking assist device.

BRIEF DESCRIPTION OF THE DRAWINGS

The above and other objects, features and advantages of the present disclosure will become more apparent from the following detailed description made with reference to the accompanying drawings. In the drawings:

FIG. 5 is a diagram showing an example of a command correspondence table;

DETAILED DESCRIPTION

Figure 1:
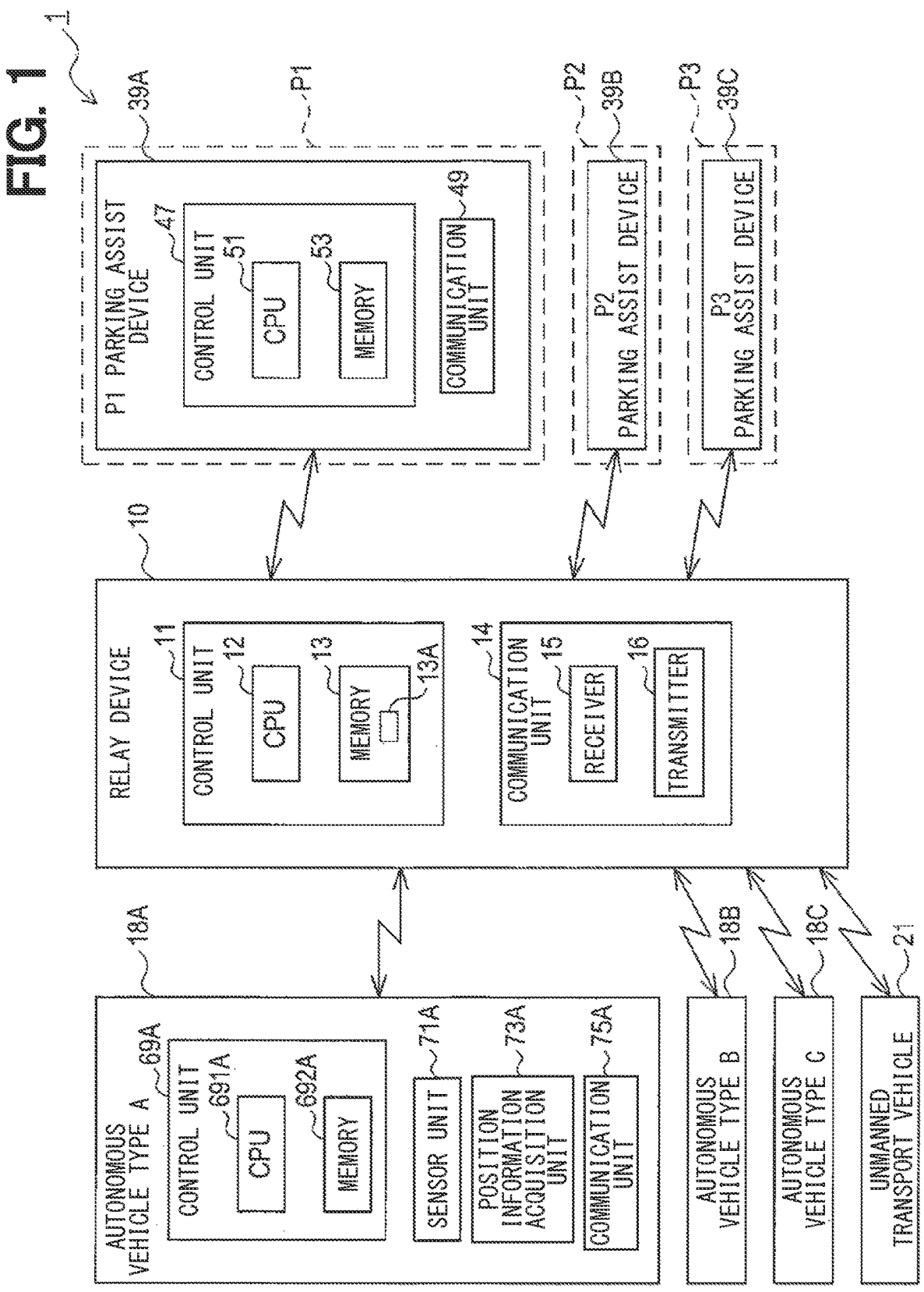
FIG. 1 is a block diagram showing a configuration of a parking assist system according to a first embodiment.

Hereinafter, examples of the present disclosure will be described.

According to an example of the present disclosure, a parking assist device is configured to guide an automated vehicle in a parking lot. The automated vehicle is automatically moved between a parking position in a parking area where the automated vehicle is parked and a getting on/off area where a user gets on and off the automated vehicle.

As a result of detailed studies by the inventors, it was found that the parking assist device needs to prepare various kinds of data according to types of the automated vehicle, which complicates the configuration of the parking assist device. On the other hand, the parking assist device may communicate with the automated vehicle via a relay device.

In one example of the present disclosure, the configuration of a parking assist device is simplified using a relay device configured to relay data exchanged between (i) the parking assist device that provides parking assist for a vehicle and (ii) the vehicle that receives the parking assist.

One example of the present disclosure shows a relay device configured to relay data exchanged between a parking assist device that provides parking assist and a vehicle that receives assist from the parking assist device. Among the parking assist device and the vehicle, the parking assist device, transmitting data therefrom, is designated as a transmitter device, and the vehicle, receiving the data as a destination of data transmitted from the transmitter device, is designated as a receiver device.

The relay device includes a type determination unit, a replacement transmission unit, and a transfer unit. The type determination unit is configured to determine a type of received data representing data received from the transmitter device. The replacement transmission unit is configured to replace the received data with at least one piece of transmission data prepared in advance according to the type of the received data when the type of the received data is a preset first type, and to transmit the transmission data to the receiver device. The transfer unit is configured to transfer the received data as the transmission data to the receiver device when the received data is of a preset second type, when the type of the received data is the preset second type.

According to such a configuration, the relay device can replace the received data with the predetermined transmission data according to the type of the received data received from the transmitter device and then transmit the data. For example, when data is transmitted from the parking assist device to the vehicle, the parking assist device can simply transmit a request or the like, for causing the relay device (a) to transmit the data after replacing the request with a predetermined command or (b) to transmit the request as it is. Further, for example, when data is transmitted from the vehicle to the parking assist device, the vehicle can simply transmit the data arbitrarily, for causing the relay device (a) to transmit the data after replacing the received data with optimum data or (b) to transmit the data as it is. Therefore, the parking assist device does not need to include at least part of the configuration for transmitting a command or for processing data received from the vehicle, thereby enabling simplification of the configuration of the parking assist device.

Embodiments of the present disclosure is described below with reference to the drawings.

First Embodiment

1-1. Configuration

The configuration of a parking assist system 1 is described with reference to FIGS. 1 and 2.

As shown in FIG. 1, the parking assist system 1 includes a plurality of parking assist devices 39A, 39B, 39C, a plurality of automated vehicles 18A, 18B, 18C, an unmanned transport vehicle 21, and a relay device 10. Hereinafter, the plurality of parking assist devices 39A, 39B, and 39C are also referred to as a plurality of parking assist devices 39, and one of the plurality of parking assist devices 39A, 39B, 39C is also referred to as a parking assist device 39. Further, the plurality of automated vehicles 18A, 18B, 18C and the unmanned transport vehicle 21 are also referred to as a plurality of vehicles 18, and any one of the plurality of vehicles 18 is also referred to as a vehicle 18. The parking assist system 1 does not have to include the unmanned transport vehicle 21.

The plurality of parking assist devices 39 include a P1 parking assist device 39A, a P2 parking assist device 39B, and a P3 parking assist device 39C. The P1 parking assist device 39A is located in a parking lot P1 and performs automated valet parking for the vehicle 18 in the parking lot P1.

The P2 parking assist device 39B is located in the parking lot P2 different from the parking lot P1 and performs automated valet parking for the vehicle 18 in the parking lot P2. The P3 parking assist device 39C is located in a parking lot P3, which is different from the parking lots P1 and P2, and performs automated valet parking for the vehicle 18 in parking lot P3.

The plurality of parking assist devices 39 have the same configuration. Below, the P1 parking assist device 39A is described as a representative of the plurality of parking assist devices 39. The P1 parking assist device 39A includes a control unit 47 and a communication unit 49. The control unit 47 includes a microcomputer having a CPU 51 and a semiconductor memory (hereinafter referred to as a memory 53) such as a RAM or a ROM, for example.

The CPU 51 executes a program stored in a non-transitory tangible storage medium to perform operations to be provided by the control unit 47. In this example, the memory 53 corresponds to a non-transitory tangible storage medium storing the program. When the program is executed, a method corresponding to the program is performed. The control unit 47 may include one or more microcomputers.

The control unit 47 has a configuration for transmitting guidance routes to target positions and various instructions to the plurality of vehicles 18. However, as long as the control unit 47 has a configuration for transmitting at least the target position, the control unit 47 does not have to have the function of transmitting the guidance route and various instructions.

The memory 53 stores map information of the relevant parking lot. The map information also includes information representing a state of compartments in a parking area 7. The state of compartments includes a state of being vacant (hereinafter referred to as a vacant state) and a state of being occupied by the plurality of vehicles 18 (hereinafter referred to as an occupied state). The communication unit 49 can communicate with multiple vehicles 18 via the relay device 10.

The memory 53 further stores a program for performing parking assist. The program includes a program for generating a target position and guidance route, and a program for transmitting various instructions as necessary. In addition, the program includes a data relay program of the present disclosure.

The relay device 10 is configured to relay communication between the plurality of parking assist devices 39 and the plurality of vehicles 18. However, as described later, the relay device 10 recognizes a type of data received (that is, received data). The relay device 10 has a function as an SGW that not only performs simple relaying, but also performs some action on the data to be relayed. SGW is an abbreviation for Service Gate Way. Specifically, the relay device 10 has, as the functions of the SGW, a function of replacing received data with one or more commands and transmitting the received data according to the type of received data, a function of relaying the received data as it is, a function of sifting or editing the received data and transmitting the received data.

The relay device 10 includes a control unit 11 and a communication unit 14. The control unit 11 includes a microcomputer having a CPU 12 and a semiconductor memory such as RAM or ROM (hereinafter referred to as a memory 13).

Each function of the control unit 11 is realized by the CPU 12 executing a program stored in the non-transitory tangible storage medium. In this example, the memory 13 corresponds to the non-transitory tangible storage medium for storing a program. By executing the program, a method corresponding to the program is performed. Note that the control unit 11 may be provided with one microcomputer, or may be provided with a plurality of microcomputers.

The communication unit 14 has a receiver 15 and a transmitter 16. The receiver 15 has a function of receiving data from each of the plurality of vehicles 18 and the plurality of parking assist devices 39 connected by wireless communications or wired communications. The transmitter 16 has a function of transmitting data to each of the plurality of vehicles 18 and the plurality of parking assist devices 39 according to instructions from the control unit 11.

Figure 2:
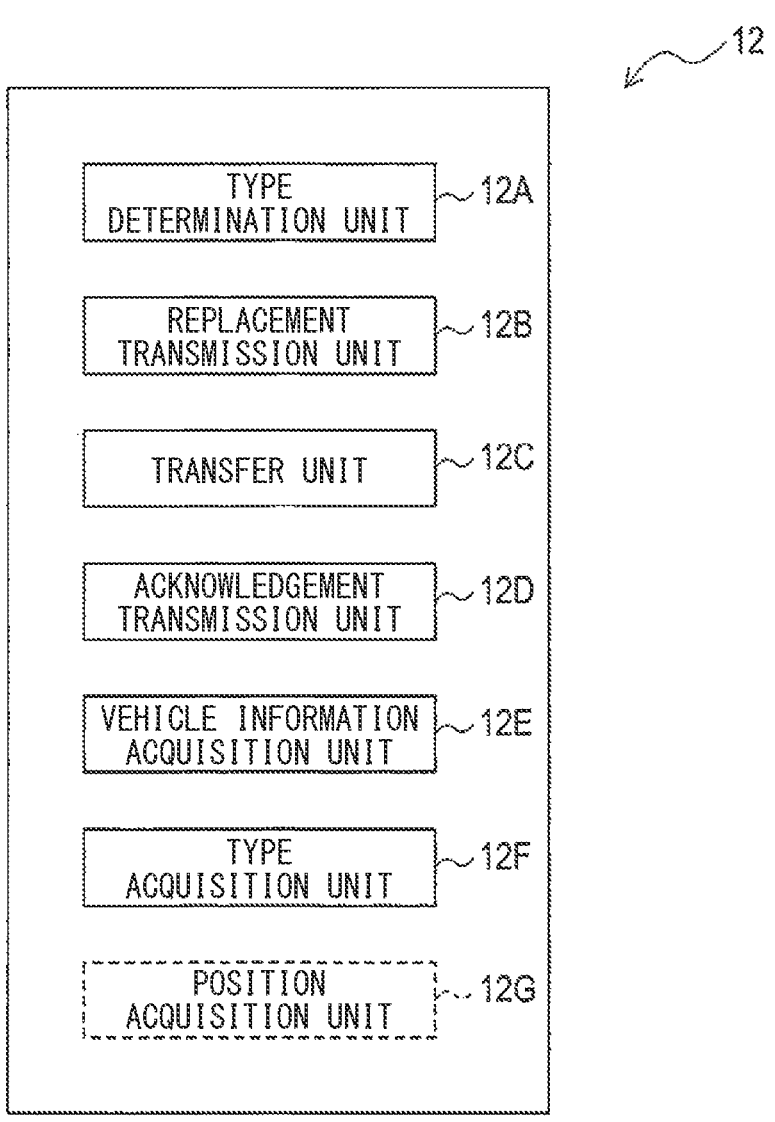
FIG. 2 is a block diagram showing functions of a control unit.

As functions performed by the control unit 11, the control unit 11 includes, as shown in FIG. 2, a type determination unit 12A, a replacement transmission unit 12B, a transfer unit 12C, an acknowledge transmission unit 12D, a vehicle information acquisition unit 12E, and a type acquisition unit 12F. The transfer unit may include a first transfer unit and a second transfer unit.

Using these functions, the control unit 11 realizes a function of relaying data exchanged between the plurality of parking assist devices 39 and the plurality of vehicles 18, a function of replacing received data with transmission data that is different from the received data and transmitting the transmission data, and the like. Note that the control unit 11 recognizes information about a communication partner included in the received data, and transmits the transmission data based on the received data to the communication partner.

A plurality of automated vehicles 18A, 18B, and 18C each have the same hardware configuration. Below, the automated vehicle 18A is described as a representative of these automated vehicles 18A, 18B, and 18C. The automated vehicle 18A includes a control unit 69A, a sensor unit 71A, a position information acquisition unit 73A, and a communication unit 75.

The control unit 69A controls each part of the automated vehicle 18A. The automated driving function is implemented by the control performed by the control unit 69A. The automated vehicle 18A acquires the map information of the parking lot and the target position from the parking assist device 39, and uses the guidance route based on the map information of the parking lot and the target position when performing automated driving.

The sensor unit 71A acquires surrounding information representing a situation around the automated vehicle 18A. The contents of the surrounding information include, for example, positions of obstacles existing around the automated vehicle 18A. The sensor unit 71A includes, for example, a camera, a LiDAR, and the like. The automated vehicle 18A uses the surrounding information when performing automated driving.

The position information acquisition unit 73A acquires position information of the automated vehicle 18A. The position information acquisition unit 73A is, for example, a position estimation system using the LiDAR and a map. The automated vehicle 18A uses the position information when performing automated driving. However, in a configuration of the second embodiment, which is described later, the automated vehicle 18A does not have to be equipped with the position information acquisition unit 73A. The communication unit 75A can communicate with the parking assist device 39A.

Herein, the parking assist system 1 has an automated valet parking function. The automated valet parking function is a function that realizes control for moving the plurality of vehicles 18 in a parking lot to parking positions or target positions such as an exiting vehicle compartment 5 or the like. The automated valet parking function includes, for realizing control of the parking assist system 1 to move the plurality of vehicles 18 to target positions, a map acquisition function, a target setting function, a general route function, a position acquisition function, a situation acquisition function, a detailed route function, and a vehicle control function and the like are provided. As is described later, these functions are assigned either to the vehicle (that is, the plurality of vehicles 18) or to the plurality of parking assist devices 39.

The map acquisition function is a function for acquiring the map information indicating detailed positions of aisle spaces and parking spaces of the parking lots P1, P2, and P3 and the usage status of each of the parking spaces. The target setting function is a function of setting a target position to which the vehicle 18 is moved (that is, a parking compartment serving as a parking position or the exiting vehicle compartment 5) according to map information. The map information is stored, for example, in the memory 53 of the parking assist device 39, and is provided to the vehicle 18 as required.

The general route function is a function for setting a guidance route to a target position according to the map information. Note that the guidance route is a schematic route indicating directions such as at which point to turn right or left. The position acquisition function is a function of repeatedly acquiring the position of the vehicle 18.

The situation acquisition function is a function for repeatedly acquiring the situation around the vehicle 18. The detailed route function is a function for setting a specific travel route based on the guidance route, the position of the vehicle 18, the situation around the vehicle 18, and the map information. Note that the travel route is a detailed route that represents in units of several centimeters where the vehicle 18 will travel, such as a lateral position in the route, when the vehicle 18 actually travels along the guidance route. The vehicle control function is a function of controlling the vehicle 18 according to the travel route.

As for the automated valet parking function, there are plural types of the automated valet parking function, depending on to which one of the vehicle (that is, the plurality of vehicles 18) or the parking lot (that is, the plurality of parking assist devices 39) the above-described functions are assigned. That is, depending on function arrangement of the automated valet parking, there are plural types automated valet parking.

For example, in the first type, a parking lot side has the target setting function assigned thereto, and a vehicle side has the general route function, the position acquisition function, the situation acquisition function, the detailed route function, and the vehicle control function assigned thereto. The map acquisition function is provided on the parking lot side and the vehicle side.

In the second type, the parking lot side has the map acquisition function, the target setting function, the general route function, the position acquisition function, the situation acquisition function, and the detailed route function assigned thereto, and the vehicle side has the vehicle control function assigned thereto.

In the third type, the parking lot side has the map acquisition function, the target setting function, and the general route function assigned thereto, and the vehicle side has the position acquisition function, the situation acquisition function, the detailed route function, and the vehicle control function assigned thereto. Depending on the type of these automated valet parking functions, the contents of information exchanged between the vehicle side and the parking lot side also differs.

Herein, the plurality of parking assist devices 39 specify the vehicle 18 and transmit various types of data. The various types of data include information such as a target position and map data, a request, an acknowledgment that data has been received from the vehicle, and the like. Specifically, the request includes an AVP function ON request. AVP stands for Auto Valet Parking. The AVP function ON request is an instruction of, when a plurality of parking assist devices 39 start to perform the automated valet parking, requesting the plurality of vehicles 18 to shift from (a) manual driving or automated driving other than automated valet parking to (b) a mode in which automated valet parking is performed. The AVP function ON request is transmitted regardless of the type of the plurality of parking assist devices 39. For example, when a plurality of parking assist devices 39 each receive a parking entry request or a parking exit request by an operation from a user, an AVP function ON request is transmitted to the vehicle 18 designated by the user.

Note that the parking entry request is a request to park the vehicle 18 specified by the user from an entering vehicle compartment 3 (to be described later) into the parking area 7. The parking exit request is a request to bring the vehicle 18 specified by the user from the parking area 7 to the exiting vehicle compartment 5.

In addition to the AVP function ON request, the requests transmitted by the plurality of parking assist devices 39 include, for example, a stop request that is a request to stop the plurality of vehicles 18 that are traveling, a change request to change the target positions of the plurality of vehicles 18, and the like. The stop request is transmitted, for example, when an abnormality occurs in any one of the plurality of vehicles 18. The change request is transmitted, for example, when the target position needs to be changed after the stop request.

In addition, regardless of the types, the parking assist devices 39 transmit, as communications associated with the target setting function, the target positions having been set to the plurality of vehicles 18. In addition, the plurality of vehicles 18 each transmit, to the parking assist device 39 that manages the relevant vehicle 18, vehicle information representing at least one of the vehicle's travel state and travel environment, such as a travel speed, a position of a subject vehicle, a fact that the vehicle has arrived at the target position, the presence or absence of an abnormality in the vehicle, or the like. Any data transmitted from the vehicle 18 is also referred to as vehicle data.

In addition, the plurality of parking assist devices 39 can transmit data necessary for realizing automated valet parking to the plurality of vehicles 18.

In the present embodiment, the plurality of vehicles 18 includes a type A automated vehicle 18A, a type B automated vehicle 18B, a type C automated vehicle 18C, and the unmanned transport vehicle 21. As the plurality of vehicles 18, at least one vehicle 18 having at least one type may be included from among the vehicles described above.

For example, the plurality of vehicles 18 are manufactured by different manufacturers. Therefore, the plurality of vehicles 18 may have different communication methods available for communications, types of commands, and the like. As the communication method, the vehicle 18 selects and adopts, for example, a physical communication method such as full-duplex communication or half-duplex communication, or a logical communication method such as a communication protocol.

In the present embodiment, the plurality of parking assist devices 39 and the plurality of vehicles 18 all correspond to the second type described above, and employ full-duplex communication as a physical communication method. Further, MQTT is adopted as a communication protocol for the plurality of parking assist devices 39, the type A automated vehicle 18A, the type C automated vehicle 18C, and the unmanned transport vehicle 21. In addition, WebSocket is adopted in the type B automated vehicle 18B. Note that MQTT is an abbreviation for Message Queuing Telemetry Transport.

In the communication of second type, a plurality of parking assist devices 39 has the target setting function, the general route function, the position acquisition function, the situation acquisition function, and the detailed route function assigned thereto, and the vehicle has the vehicle control function assigned thereto.

A case where some of the plurality of parking assist devices 39 and the plurality of vehicles 18 are of a type other than the second type is described later in the second embodiment.

The unmanned transport vehicle 21 has a hardware configuration for performing automated driving similar to that of the automated vehicle 18A. However, the unmanned transport vehicle 21 holds map information regarding the parking lot where the unmanned transport vehicle 21 is located. The unmanned transport vehicle 21 uses map information, for example, when performing automated driving.

The unmanned transport vehicle 21 can travel, for example, in a state in which any vehicle including the automated vehicle 18 is placed on the unmanned transport vehicle 21 (hereinafter referred to as a placed state). Further, the unmanned transport vehicle 21 can be transitioned between the non-placed state and the placed state by crawling under the vehicle and carrying the vehicle. Further, the unmanned transport vehicle 21 has a function of automatically driving to a target position along a set guidance route.

The unmanned transport vehicle 21 can transport an arbitrary vehicle to a target position by performing automated driving to the target position along the guidance route in the placed state. The vehicles transported by the unmanned transport vehicle 21 may be the automated vehicles 18A, 18B, and 18C, or may be vehicles other than the automated vehicle 18, that is, vehicles without automated driving functions.

1-2. Configuration of Parking Lot

Figure 3:
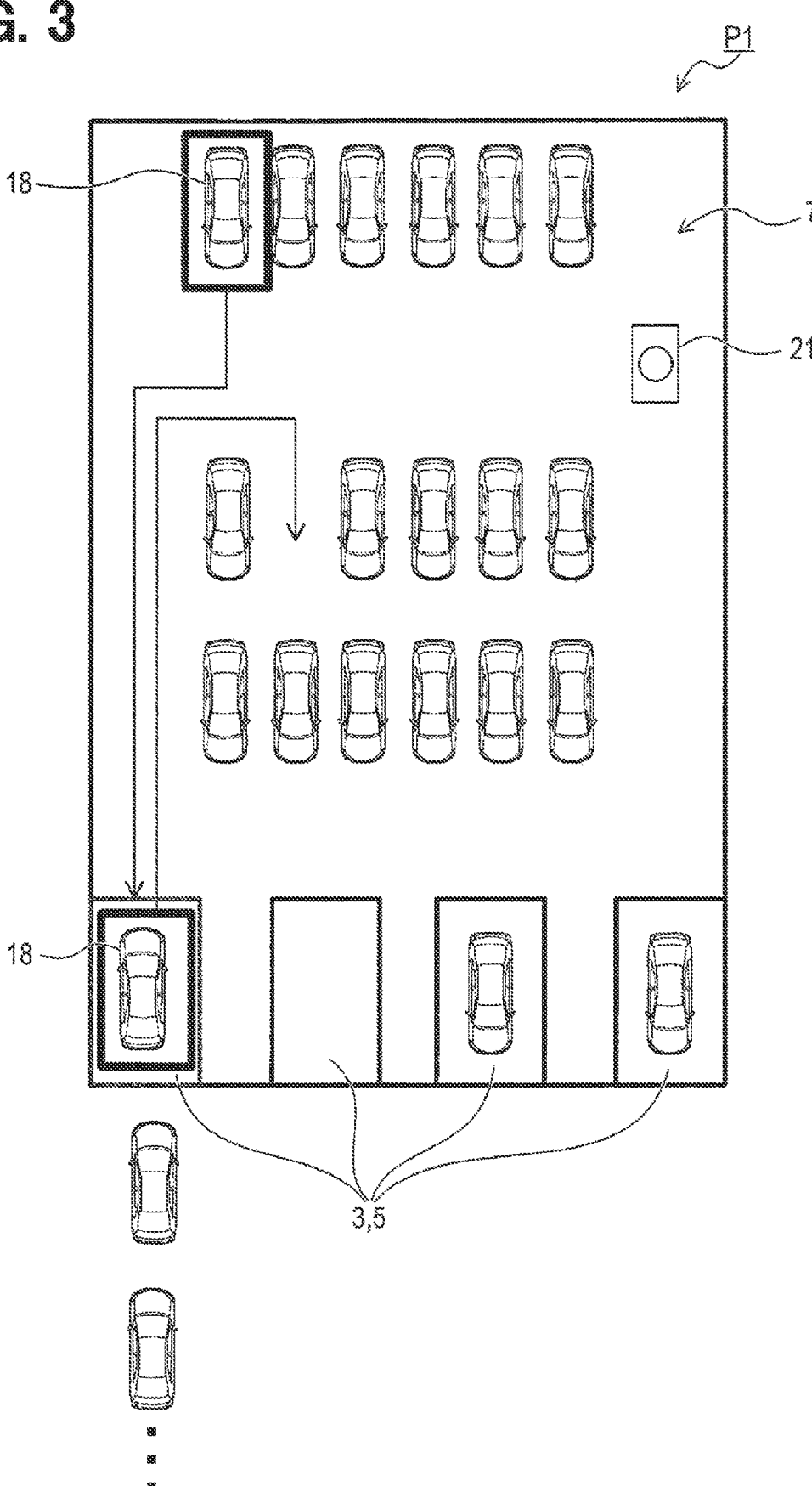
FIG. 3 is a plan view of a parking lot.

The parking lot P1 includes, for example, as shown in FIG. 3, the entering vehicle compartment 3 set as an area where the user gets off from the vehicle 18, the exiting vehicle compartment 5 set as an area where the user gets on the vehicle 18, and the parking area 7. The illustration of the parking lots P2 and P3 is omitted. The parking lots P2 and P3 may be provided with the entering vehicle compartment 3, the exiting vehicle compartment 5, and the parking area 7 in the same manner as the parking lot P1. However, the sizes of the entering vehicle compartment 3, the exiting vehicle compartment 5, and the parking area 7, that is, the number of vehicles that can be parked, may be arbitrarily set for each of the parking lots P1, P2, and P3.

Further, in the following, an area containing the entering vehicle compartment 3, the exiting vehicle compartment 5, and the parking area 7 is also designated as the parking lot. Further, the entering vehicle compartment 3 and the exiting vehicle compartment 5 are compatible with each other, and may be collectively referred to as getting on/off areas 3 and 5, respectively. Alternatively, the entering vehicle compartment 3 and the exiting vehicle compartment 5 may be dedicated compartments, respectively.

Each of the getting on/off areas 3 and 5 is provided with a plurality of compartments. A plurality of vehicles 18 can enter the entering vehicle compartment 3 from the outside of the parking lot. The entering vehicle compartment 3 and the exiting vehicle compartment 5 are adjacent to facilities such as shops. An occupant of the vehicle 18 entering the entering vehicle compartment 3 can get off the vehicle 18 and proceed to the facility on foot.

The exiting vehicle compartment 5 is connected to the outside of the parking assist system 1. A plurality of vehicles 18 can proceed to the outside of the parking assist system 1 from the exiting vehicle compartment 5. The occupant can proceed to the exiting vehicle compartment 5 from the facility on foot.

The parking area 7 is a place where a plurality of vehicles 18 can be parked. A plurality of compartments are provided inside the parking area 7. Each of the compartments provided in the entering vehicle compartment 3, the exiting vehicle compartment 5, and the parking area 7 is an area in which one of the plurality of vehicles 18 can be parked.

A plurality of vehicles 18 can travel from the entering vehicle compartment 3 to the parking area 7. A plurality of vehicles 18 can travel from the parking area 7 to the exiting vehicle compartment 5.

1-3. Process

The relay device 10 of the present embodiment performs at least the following functions, however, description of transmission and reception of acknowledge is omitted:

[A1] A function of replacing the AVP function ON request transmitted by the parking assist device 39 with a plurality of commands and transmitting the plurality of commands;

[A2] A function of relaying map information of the parking lots P1, P2, and P3 transmitted from the parking assist device 39 to the vehicle 18 (that is, communication for the map acquisition function);

[A3] A function of relaying vehicle information including the position of the vehicle 18 transmitted from the vehicle 18 to the parking assist device 39 (that is, communication for the position acquisition function and the situation acquisition function);

[A4] A function of relaying the transmitted target position set by the parking assist device 39 to the vehicle 18 (that is, communication for the target setting function); and

[A5] A function of relaying the guidance route set by the parking assist device 39 together with the target position to the vehicle 18 (that is, communication for the general route function and the detailed route function).

In the following, the operations performed by the relay device 10 when realizing these functions is briefly described, and the function [A1] is described in detail.

Figure 4:
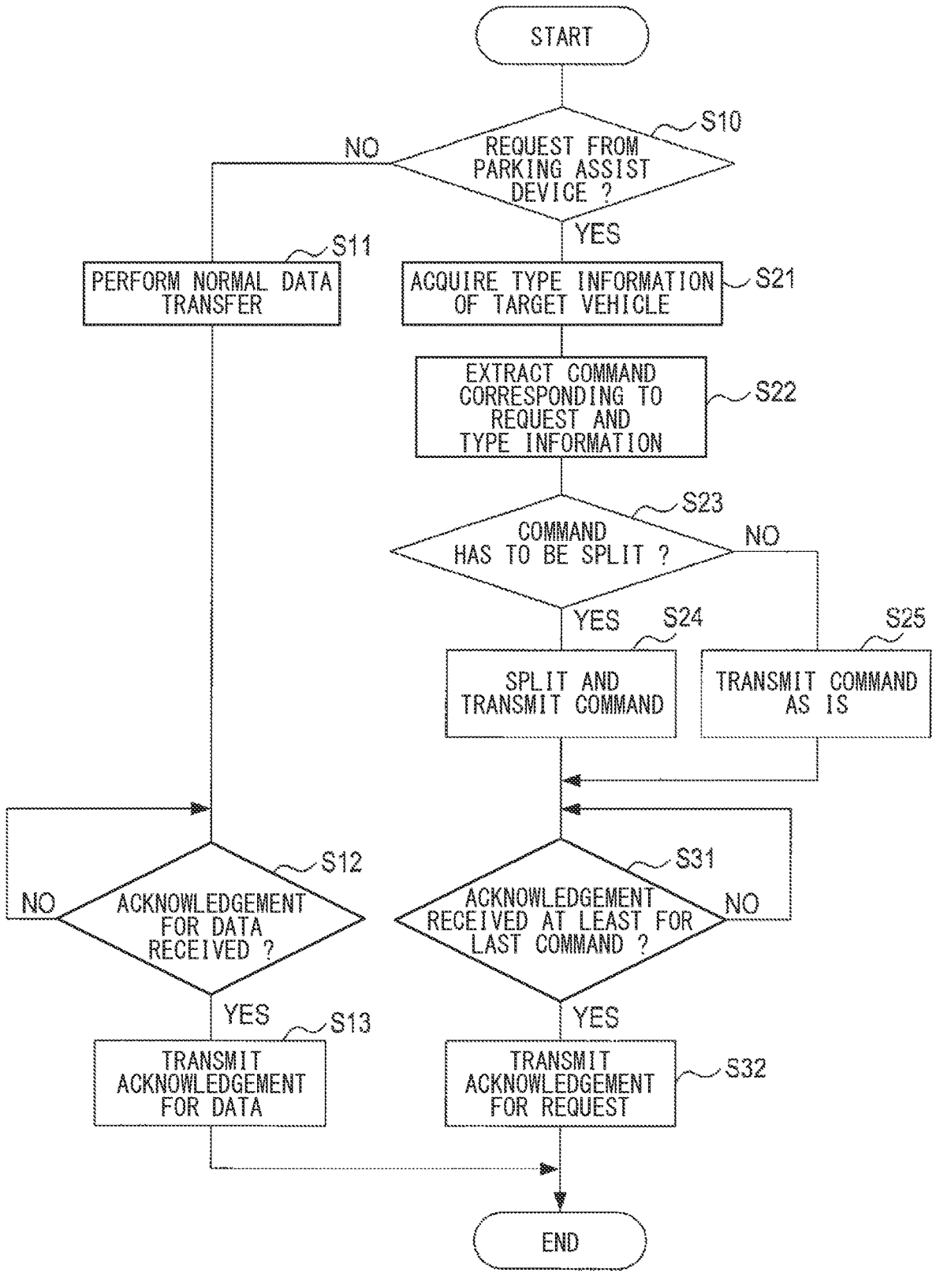
FIG. 4 is a flowchart showing an assist relay process performed by the control unit of a relay device.

Upon receiving some of the data from the parking assist device 39, the control unit 11 of the relay device 10 performs an assist relay process shown in FIG. 4. In this case, the parking assist device 39 corresponds to a transmitter device of the present disclosure, and the vehicle 18 corresponds to a receiver device of the present disclosure. In addition, the assist relay process corresponds to a data relay method in the present disclosure.

In the assist relay process, first, in S10, the type determination unit 12A of the control unit 11 recognizes a type of data received from the parking assist device 39, and determines whether or not the type of data is a request from among request, information, acknowledge, and the like.

When the type determination unit 12A determines in S10 that the data type is not a request, the process proceeds to S11, and the transfer unit 12C performs normal data transfer. That is, the received data is relayed to the vehicle 18 as it is as the transmission data. However, the transmission data is transmitted using a communication protocol corresponding to the destination vehicle 18. The communication protocol corresponding to the destination vehicle 18 can be identified by referring to a command correspondence table 13A, which is described later.

Subsequently, in S12, the acknowledge transmission unit 12D of the control unit 11 determines whether or not an acknowledge for the transmission data has been received from the vehicle 18. When the acknowledge transmission unit 12D determines in S12 that an acknowledge for the transmission data has not been received, the process returns to S12.

On the other hand, when the acknowledge transmission unit 12D determines in S12 that an acknowledge has been received for the transmission data, the acknowledge transmission unit 12D proceeds to S13 and transmits an acknowledge, which is a response to the received data received from the parking assist device 39, to the parking assist device 39. After S13, the present process ends the assist relay process of FIG. 4.

When the control unit 11 determines in S10 that the data type is a request, the process proceeds to S21, and the replacement transmission unit 12B acquires the type information of a target vehicle 18 to which the data is transmitted. For example, the type information is acquired immediately after establishing communication with the automated vehicle 18 and is stored in the memory 13. The type information includes information for identifying the type of automated valet parking function described above, the communication method used for communication, the type of control program, the type of command, and the like.

Subsequently, in S22, the replacement transmission unit 12B extracts a command corresponding to the request and the type information. For example, a command correspondence table 13A as shown in FIG. 5 is prepared in the memory 13 in advance. The command correspondence table 13A includes multiple data sets. In the data set, when the type of received data and the type information are identified, the type of received data and the type information are associated so that one or more commands to be transmitted are identified. Each data set is a table in which a plurality of types of transmission data are associated in advance with one combination of received data type and type information.

The command correspondence table 13A shown in FIG. 5 is set so that it is possible to identify which command is to be transmitted with which protocol for each of the vehicles 18A, 18B, and 18C classified by the type information in response to the AVP function ON request.

For example, when the vehicle 18, which is the destination of the transmission data, is classified as vehicle A based on the type information, the communication protocol is set to MQTT as shown in FIG. 5. In addition, it is set to transmit each of the commands of door lock, IG-ON (that is, ignition ON), power window closing, door mirror retraction, hazard lamp turning off, headlight setting to automated, and air conditioner OFF.

In such manner, the replacement transmission unit 12B sets the communication protocol and the type of the command configured to be transmitted differently depending on which of the vehicle 18 to which the transmission data is transmitted is classified based on the type information. In other words, the replacement transmission unit 12B replaces the received data with at least one piece of transmission data prepared in advance according to the type, and also converts the communication method as necessary.

Subsequently, in S23, the control unit 11 determines whether or not the command needs to be split and transmitted. A case where a command needs to be split and transmitted means a case where a plurality of commands are associated with received data and the plurality of commands cannot be transmitted at the same time. When a plurality of commands cannot be transmitted simultaneously, the control unit 11 must transmit a certain command, wait temporarily until receiving an acknowledge or the like, and then transmit another command.

When the control unit 11 determines in S23 that it is necessary to split and transmit the command, the process proceeds to S24 and splits and transmits the command.

Herein, specific data exchange when the vehicle A shown in FIG. 5 receives an AVP function ON request is described with reference to FIG. 6. When receiving the AVP function ON request from the parking assist device 39, the control unit 11 first transmits a door lock request to the vehicle 18. Then, when the control unit 11 receives an acknowledge from the vehicle 18 indicating that the door lock has been completed, i.e., an acknowledgment of the door lock request, the control unit 11 transmits an IG-ON request.

Further, upon receiving the completion of IG-ON, the control unit 11 collectively transmits a request to retract the door mirrors and a request to turn off the air conditioner. Note that it is possible to omit the request for items regarding which (a) the vehicle state has been received before the present process and (b) it is recognized that the setting has already been complete. In the case of the present embodiment, in the command correspondence table 13A shown in FIG. 5, even though the control unit 11 is configured to perform the hazard lamp off request and the headlight auto ON request, transmission of these requests are omitted in FIG. 6, since these settings are already complete. When the control unit 11 has transmitted all of the split commands, the process proceeds to S31 in FIG. 4.

On the other hand, when the replacement transmission unit 12B determines in S23 that it is not necessary to split the command and transmit it, the process proceeds to S25, and the command to be transmitted is transmitted without being split. A command to be transmitted may include multiple commands.

Subsequently, in S31, the acknowledge transmission unit 12D determines whether or not an acknowledge for at least the last command has been received. Herein, it is determined whether or not acknowledge for all transmission data has been received. However, when at least the acknowledge for the last command has been received, it can be estimated that the commands before the last one have been received normally, so it may be OK to determine whether or not the acknowledge for the last command has been received.

When the acknowledge transmission unit 12D determines in S31 that the acknowledge for the last command has not been received, the process returns to S31. When the acknowledge transmission unit 12D determines in S31 that at least the acknowledge for the last command has been received, the acknowledge transmission unit 12D proceeds to S32 and transmits to the parking assisting device 39 an acknowledge for the request from the parking assisting device 39.

Figure 6:
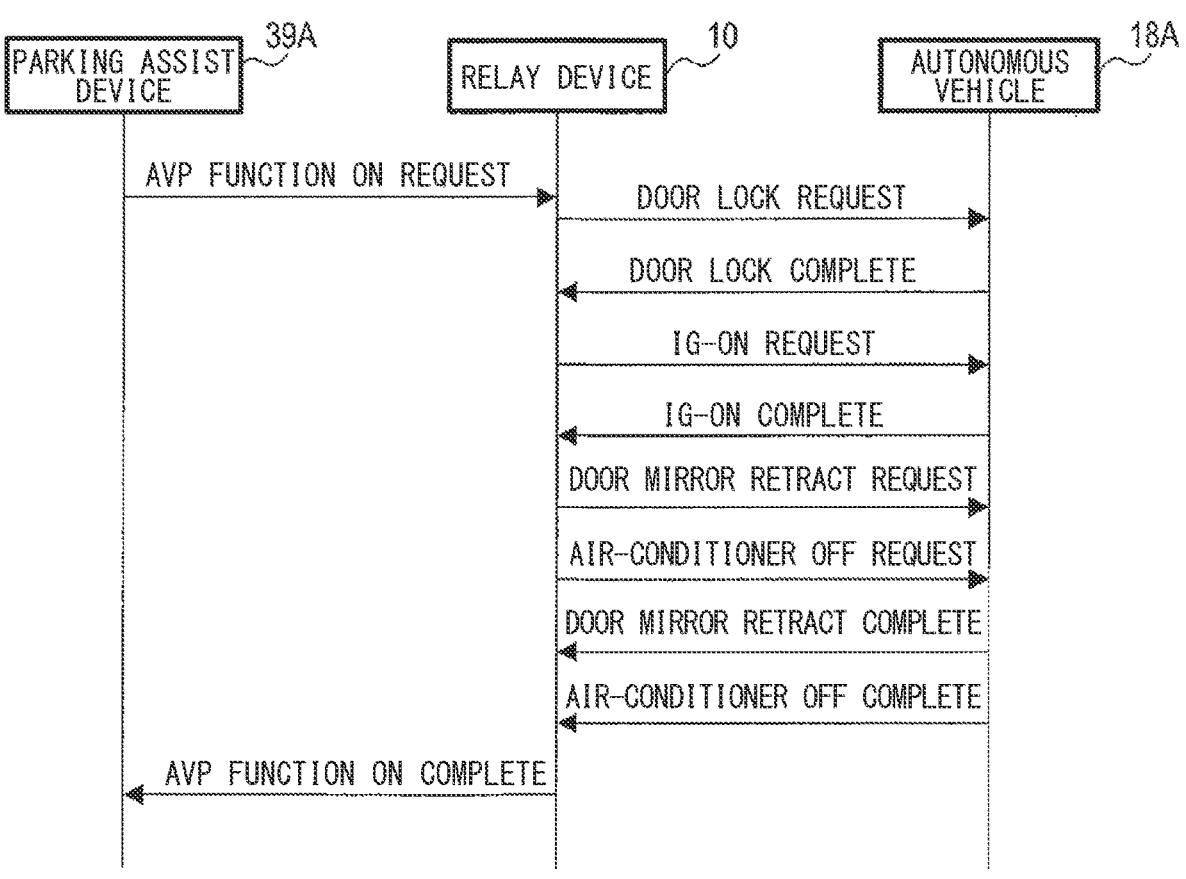
FIG. 6 is a ladder chart showing an example of data exchanged between a parking assist device, the relay device, and an automated vehicle.

In the example of FIG. 6, upon receiving an acknowledge indicating that turning off of the air conditioner is complete, the relay device 10 transmits an acknowledge of the AVP function ON request to the parking assist device 39. The parking assist device 39 can recognize that multiple commands have been transmitted to the vehicle 18 by receiving one acknowledge for the request. After S32, the present process ends the assist relay process of FIG. 4.

In the assist relay process described above, the data is relayed without being sifted, as in the vehicle relay process described later. However, depending on the type of data, the same process as the vehicle relay process described later may also be performed.

Figure 7:
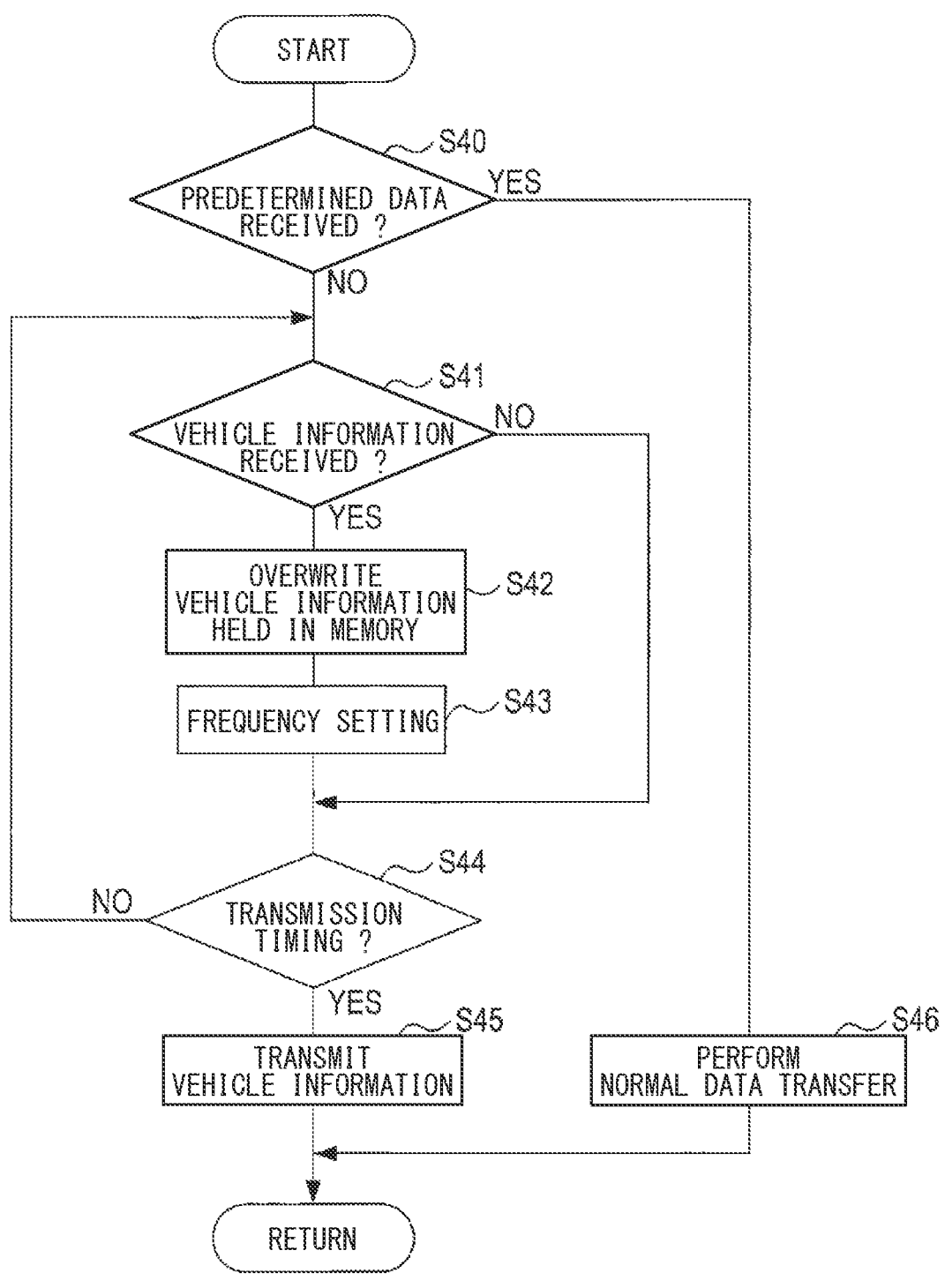
FIG. 7 is a flowchart showing a vehicle relay process according to the first embodiment performed by the control unit of the relay device.

Next, upon receiving the vehicle data from the vehicle 18, the control unit 11 of the relay device 10 performs the vehicle relay process shown in FIG. 7. In this case, the vehicle 18 corresponds to the transmitter device of the present disclosure, and the parking assist device 39 corresponds to the receiver device of the present disclosure.

In the vehicle relay process, first, in S40, the transfer unit 12C determines whether or not data of a predetermined type other than the vehicle information has been received. Data of a predetermined type includes data of a relatively urgent type, such as a request from the vehicle 18, an alert and the like.

When data of the predetermined type has been received in S40, the process proceeds to S46, and the transfer unit 12C performs normal data transfer. That is, the transfer unit 12C immediately transfers the vehicle data to the parking assist device 39 without sifting the data.

On the other hand, when data of a predetermined type has not been received in S40, the process proceeds to S41, and the vehicle information acquisition unit 12E of the control unit 11 determines whether or not the vehicle information has been received from the automated vehicle 18. The vehicle information is information representing at least one of the travel state and travel environment of the vehicle 18.

In the present embodiment, the relay device 10 acquires the vehicle information from the vehicle 18, but at least part of the vehicle information may be acquired from another source other than the vehicle 18. For example, the vehicle information may be acquired from a vehicle state recognition device configured to recognize at least one of the travel state of the vehicle 18 and the travel environment outside the vehicle 18. The vehicle information may include, for example, a travel state such as a speed and a position of the vehicle 18, the presence or absence of an abnormality, an operating state of the lights, and the like, beside including a travel environment such as a width of the lane, a distance to both lateral ends of the lane and the like.

When the vehicle information acquisition unit 12E determines in S41 that the vehicle information has not been received, the process proceeds to S44. Further, when the vehicle information acquisition unit 12E determines in S41 that vehicle information has been received, the process proceeds to S42, and the transfer unit 12C overwrites the vehicle information held in the memory 13.

Subsequently, in S43, the transfer unit 12C sets the frequency of transmitting the vehicle information to the parking assist device 39, in other words, a cycle of transmitting the vehicle information, according to the vehicle information. For example, the transfer unit 12C recognizes that an urgency is high, when the vehicle 18 has an abnormality, when the travel speed of the vehicle 18 is equal to or higher than a specific threshold value, when the distance between the vehicle 18 and both lateral ends of the lane is short, and the like.

When the urgency is high, the transfer unit 12C sets the frequency of transmitting the vehicle information to high, and, depending on the situation, sets the frequency to match the cycle of acquiring the vehicle information. On the other hand, when the urgency is low, such as when there is no abnormality in the vehicle 18, the frequency is set to low, e.g., lower than when the urgency is high. In this case, the vehicle information is set to be transferred to the parking assist device 39 at a lower frequency than the vehicle information is received.

Subsequently, the transfer unit 12C determines whether or not it is a timing to transmit data to the parking assist device 39. Whether or not it is a timing to transmit data is determined based on whether or not a period of time from when the data was transmitted last time has matches the cycle of transmitting the vehicle information.

When the transfer unit 12C determines in S44 that it is not the timing to transmit data to the parking assist device 39, the process returns to S41. On the other hand, when the transfer unit 12C determines in S44 that it is the timing to transmit data to the parking assist device 39, the process proceeds to S45 to transmit the vehicle information. Since the vehicle information here is only the latest vehicle information among the vehicle information received a plurality of times, the sifted vehicle information is transmitted to the parking assist device 39. After the process of S45, the present process ends.

1-4. Modification of the First Embodiment

In the vehicle relay process of the first embodiment, the relay device 10 sifts vehicle data and transmits the vehicle data to the parking assist device 39. However, new data may be generated based on the vehicle data and the new data may be transmitted to the parking assist device 39.

Figure 8:
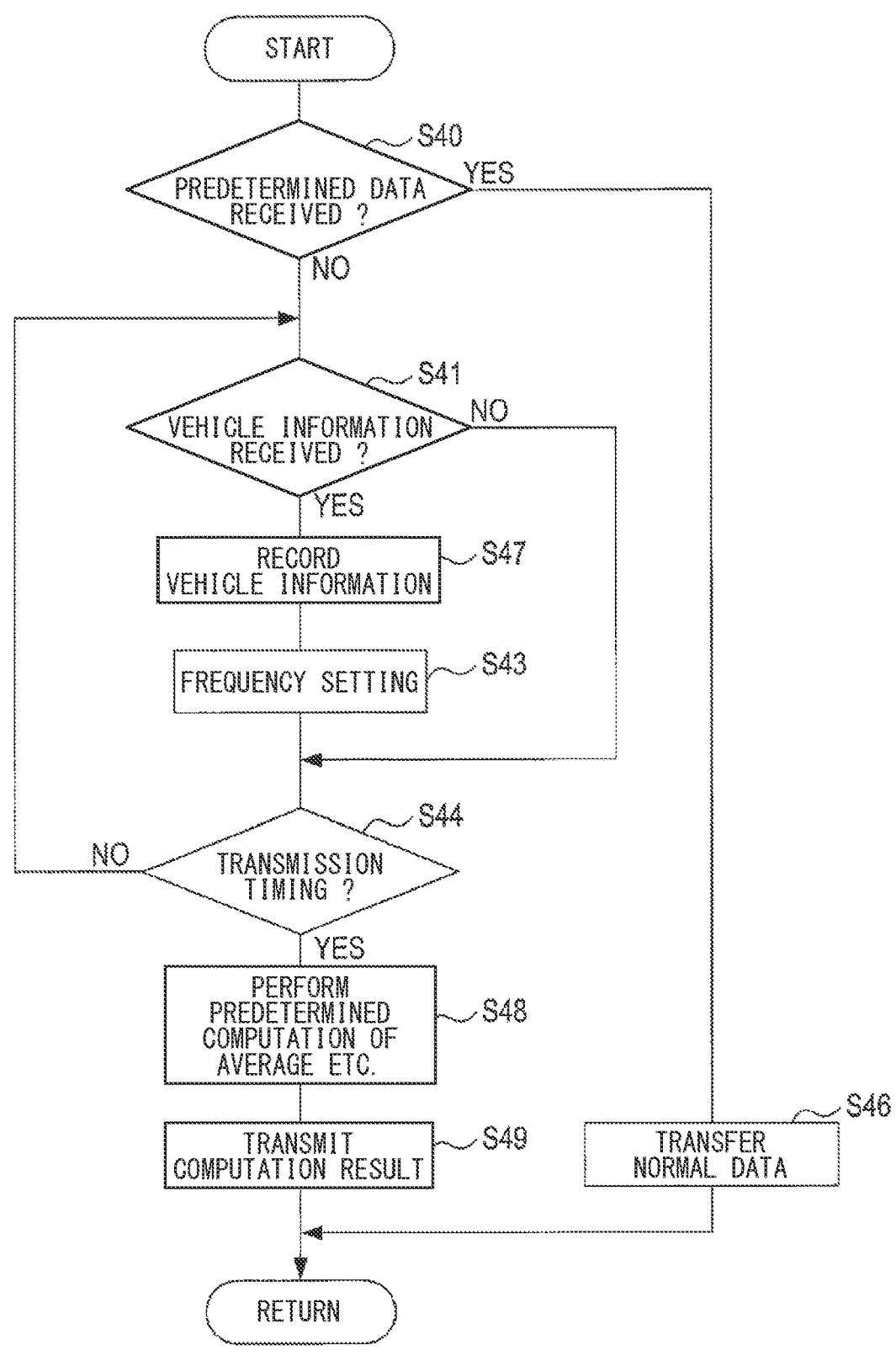
FIG. 8 is a flowchart showing a modification of vehicle relay process performed by the control unit of the relay device.

In such case, instead of performing the vehicle relay process of the first embodiment, a modified vehicle relay process shown in FIG. 8 may be performed, for example. In the modified vehicle relay process, when the vehicle information is received in S41 as described above, the process proceeds to S47, and the transfer unit 12C stores the received vehicle information in the memory 13. That is, in the present process, previously received vehicle information is held in the memory 13 together with newly received vehicle information without overwriting the previously received vehicle information.

After S47, the process proceeds to S43 described above. Subsequently, when it is the transmission timing for each type of data in S44, the transfer unit 12C proceeds to S48 and performs a predetermined computation on the plurality of vehicle information held in the memory 13. The computation here includes, for example, performing an arbitrary computation for computing a value, such as an average value, a maximum value, a minimum value, a median value, a weighted average value, a variance, etc. based on a plurality of pieces of the vehicle information.

Subsequently, in S49, after transmitting a computation result to the parking assist device 39, the control unit 11 terminates the vehicle relay process of FIG. 8.

1-5. Effects

According to the first embodiment or the modified example described in detail above, the following effects are achievable.

(1a) One aspect of the present disclosure is the relay device 10 configured to relay data exchanged between the parking assist device 39 that provides parking assist and the vehicle 18 that receives assist from the parking assist device 39. Among the parking assist device 39 and the vehicle 18, the source of data transmission is the transmitter device, and the destination of data transmission is the receiver device.

The relay device 10 includes the type determination unit 12A, the replacement transmission unit 12B, and the transfer unit 12C. The type determination unit 12A is configured to determine the type of received data representing the data received from the transmitter device. When the type of received data is the preset first type (for example, a request in the above embodiment), the replacement transmission unit 12B is configured to replace the received data with at least one piece of transmission data prepared in advance according to the type, and to transmit the transmission data to the receiver device. When the type of received data is the preset second type (for example, data other than the request in the above embodiment), the transfer unit 12C is configured to transfer the received data as the transmission data to the receiver device.

According to such a configuration, the relay device 10 can replace the received data with the predetermined transmission data according to the type of the received data received from the transmitter device and can transmit the data. For example, when data is transmitted from the parking assist device 39 to the vehicle 18, the parking assist device 39 can simply transmit a request, for causing the relay device 10 to transmit the data after replacing the request with the predetermined command. Further, for example, when data is transmitted from the vehicle 18 to the parking assist device 39, the vehicle 18 can simply transmit the data arbitrarily, for causing the relay device 10 to transmit the data after replacing the received data with the optimum data for the parking assist device 39, or to transmit the data as it is. Therefore, the parking assist device 39 does not need to include at least part of the configuration for transmitting a command or for processing the data received from the vehicle 18, thereby enabling simplification of the configuration of the parking assist device 39.

(1b) In one aspect of the present disclosure, at least one of the replacement transmission unit 12B and the transfer unit 12C is configured to convert, when transmitting the transmission data, the communication method of the transmission data into a communication method different from the communication method having been used for receiving the received data. For example, at least one of the replacement transmission unit 12B and the transfer unit 12C is configured to convert the transmission data to be compatible with the communication method different from the communication method having been used for receiving the received data when transmitting the transmission data.

According to such a configuration, even when the parking assist device 39 and the vehicle 18 are configured to communicate by different communication methods, the communication between the parking assist device 39 and the vehicle 18 can be suitably relayed.

(1c) In one aspect of the present disclosure, the replacement transmission unit 12B is configured to replace one received data with multiple transmission data and to transmit the multiple transmission data to the receiver device. In addition, the acknowledge transmission unit 12D receives a plurality of acknowledges, which are respective responses to a plurality of transmission data, from the receiver device. Then, upon receiving an acknowledge at least for the lastly transmitted transmission data, the acknowledge transmission unit 12D is configured to transmit an acknowledge in response to the received data, back to the transmitter device.

According to such a configuration, even when a plurality of transmission data are transmitted corresponding to one received data, an acknowledge for one received data can be transmitted. That is, an exchange of an acknowledge is suitable performable.

(1d) In one aspect of the present disclosure, the transfer unit 12C is configured to transmit the transmission data to the vehicle 18 based on the received data received from the parking assist device 39. Further, the transfer unit 12C is configured to transfer the vehicle data to the parking assist device 39 at a frequency lower than the frequency of receiving the vehicle data representing the data received from the vehicle 18.

According to such a configuration, the vehicle data is transferred to the parking assist device 39 at a lower frequency than the frequency of receiving the vehicle data, thereby reducing the process load on the parking assist device 39.

(1e) In one aspect of the present disclosure, the transfer unit 12C is configured to receive multiple vehicle data and transfer an average value of the multiple vehicle data to the parking assist device 39.

According to such a configuration, the vehicle data is transmitted as the average value after computing the average value of the plurality of vehicle data.

(1f) In one aspect of the present disclosure, the transfer unit 12C is configured to transfer the vehicle data to the parking assist device 39 without lowering the transfer frequency when the vehicle data includes data of a certain type set in advance.

According to such a configuration, commands can be transferred to the parking assist device 39 without being sifted.

(1g) In one aspect of the present disclosure, the vehicle information acquisition unit 12E is configured to acquire the vehicle information representing at least one of the travel state and the travel environment of the vehicle 18. The transfer unit 12C is configured to set the frequency according to the vehicle information and to transfer the vehicle data to the parking assist device 39 at the set frequency.

According to such a configuration, it is possible to change the frequency of transferring the vehicle data to the parking assist device 39 according to the vehicle information. For example, when the speed of the vehicle 18 is high, in case that the vehicle 18 has an abnormality or is highly likely to have an abnormality, by setting a high frequency of transferring the vehicle data to the parking assist device 39, the situation of the vehicle 18 can be quickly handled.

(1h) In one aspect of the present disclosure, the type acquisition unit 12F is configured to acquire the type information representing the type when automated valet parking is performed in the vehicle 18. The replacement transmission unit 12B is configured to select a data set in which a plurality of transmission data are prepared in advance according to the type information, and to extract the transmission data according to the type of the received data from the selected data set, and to transmit the extracted transmission data.

According to such a configuration, the transmission data can be selected according to the type information and the type of the received data.

(1i) In one aspect of the present disclosure, the request to the receiver device is set as the first type, and the data other than the request to the receiver device is set as the second type.

The replacement transmission unit 12B is configured to replace the received data with at least one transmission data prepared in advance according to the type, and to transmit the transmission data when the type of the received data is the request to the receiver device.

The transfer unit 12C is configured to transfer the transmission data as transmission data without replacing the received data when the type of the received data is data other than the request to the receiver device.

According to such a configuration, it is possible to set whether or not to replace the received data depending on whether or not the received data is the request for the receiver device.

(1j) In one aspect of the present disclosure, the parking assist device 39 is configured as a device for assisting automated valet parking in the parking lot, and the vehicle 18 is configured to provide automated valet parking functionality.

According to such a configuration, the relay device 10 of the present disclosure can be applied to the parking assist system 1 having the function of assisting automated valet parking.

2. Second Embodiment

2-1. Difference from First Embodiment

The basic configuration of the second embodiment is similar to that of the first embodiment. Therefore, the difference therebetween is described below. The same reference numerals as in the first embodiment denote the same components, and reference is made to the preceding description.

In the first embodiment described above, both the parking assist device 39 and the automated valet parking function provided in the vehicle 18 are of the second type, which means that the type of the automated valet parking function matches between the parking assist device 39 and the vehicle 18. On the other hand, in a parking assist system 2 of the second embodiment, the types of automated valet parking functions are different from each other, i.e., the parking assist device 39 and the vehicle 18 have different type parking assist function, respectively, which is the difference from the first embodiment.

2-2. Configuration and Process

In the parking assist system 2, the parking assist device 39 corresponds to the first type having a least functionality, and the vehicle 18 corresponds to the second type having a least functionality. That is, the parking assist device 39 has a map acquisition function and a target setting function among the functions required for automated valet parking, and the vehicle 18 has a vehicle control function. Among the functions required for automated valet parking, the general route function, the position acquisition function, the situation acquisition function, and the detailed route function are not provided in the parking assist device 39 and the vehicle 18.

Therefore, the relay device 10 of the second embodiment has the general route function, the position acquisition function, the situation acquisition function, and the detailed route function in order to supplement the functions required for automated valet parking. Further, the relay device 10 of the second embodiment also has the map acquisition function in order to realize these functions.

Figure 9:
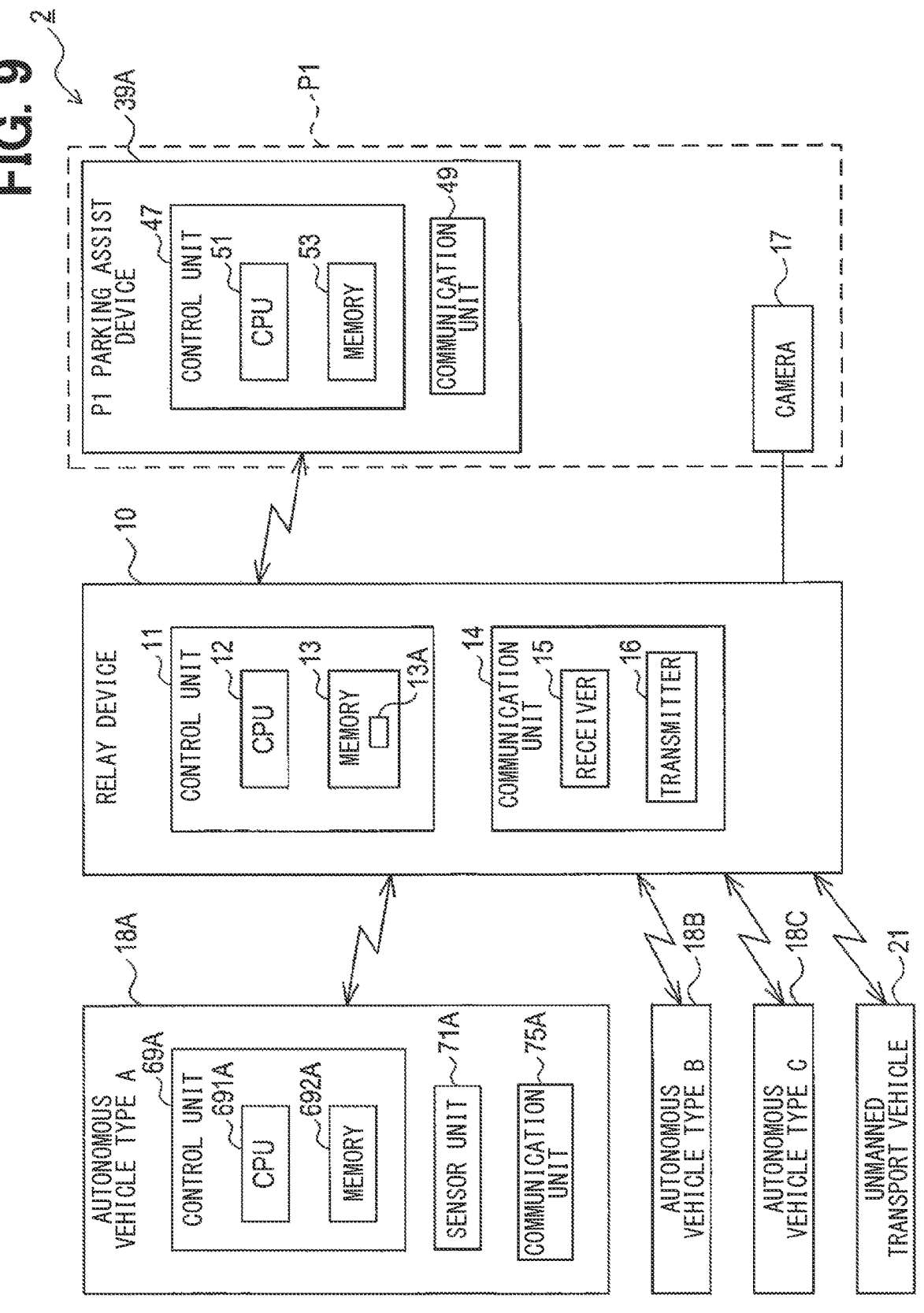
FIG. 9 is a block diagram showing the configuration of the parking assist system according to a second embodiment.

FIG. 9 shows the parking assist system 2 of the second embodiment. In the parking assist system 2, the relay device 10 is located corresponding to the parking lot P1, and includes a camera 17 configured to capture an image of the entire parking lot P1 together with the vehicle 18 in the parking lot P1. A radar device or the like may be provided instead of or in addition to the camera 17 as long as the position of the vehicle 18 in the parking lot P1 is detectable. Further, as indicated by a dashed line in FIG. 2, as a function of the control unit 11, a position detection unit 12G is provided.

The position detection unit 12G detects a position of each vehicle 18 in the parking lot P1 based on the captured image captured by the camera 17. That is, the position detection unit 12G implements the position acquisition function.

The control unit 11 of the relay device 10 also performs the general route function, the situation acquisition function, and the detailed route function. That is, when communicating with the parking assist device 39, the relay device 10 supplements the data transmitted from the vehicle 18 as when the parking assist device 39 were communicating with the vehicle 18 of the first type, and the supplemented data is generated as the transmission data and is transmitted to the parking assist device 39. Further, when communicating with the vehicle 18, the relay device 10 supplements the data transmitted from the parking assist device 39 as when the vehicle 18 were communicating with the parking assist device 39 of the second type, and the supplemented data is generated as the transmission data and is transmitted to the vehicle 18.

Specifically, the relay device 10 replaces the functions [A2], [A3], and [A5] provided in the relay device 10 of the first embodiment with the following [B2], [B3], [B5]. Therefore, the relay device 10 performs the following functions:

[A1] A function of replacing the AVP function ON request transmitted by the parking assist device 39 with a plurality of commands and transmitting them;

[B2] A function of acquiring the map information of the parking lots P1, P2, and P3 transmitted from the parking assist device 39 (which is not relayed to vehicle 18, however) (i.e., communication for map acquisition function);

[B3] A function of relaying the vehicle information transmitted from the vehicle 18 to the parking assist device 39, and a function of detecting the position of the vehicle 18 by itself (that is, communication for the position acquisition function and the situation acquisition function); and

[A4] A function of relaying the transmitted target position set by the parking assist device 39 to the vehicle 18 (that is, the target setting function).

[B5] A function to generate the guidance route and transmit it to the vehicle 18 (i.e. communication for the general route function and the detailed route function) As described above, in the parking assist system 2, the relay device 10 can absorb the difference between the types of the parking assist device 39 and the vehicle 18, and the automated valet parking is suitably realizable.

2-3. Modification of Second Embodiment

In the parking assist system 2 of the second embodiment described above, the parking assist device 39 is of the first type and the vehicle 18 is of the second type. However, other types may be used. For example, when the parking assist device 39 is of the first type and the vehicle 18 is of the third type, the parking assist device 39 and the vehicle 18 lack the general route function. However, the relay device 10 may be configured to perform the general route function.

In addition, in the parking assist system 2 of the second embodiment, a plurality of different types of vehicles 18 may coexist. When the parking assist device 39 and the vehicle 18 perform the automated valet parking, the relay device 10 compensates for the missing functions as necessary, so that even when a plurality of different types of vehicles 18 coexist, the automated valet parking can be performed for all of these vehicles 18.

In addition, when the parking assist device 39 is of the third type and the vehicle 18 is of the first type, some functions overlap among them. In such case, it may be preferable to stop some overlapping functions either explicitly or in response to an instruction from the relay device 10 or the like.

2-4. Effects

The second embodiment described above provides the effect (1a) according to the above described first embodiment and also provides the following effects.

(2a) In one aspect of the present disclosure, when either the parking assist device 39 or the vehicle 18 does not have the functions necessary for the automated valet parking, the relay device 10 compensates for the lack of functions and relays data.

According to such a configuration, even when the vehicle 18 that is not compatible with the parking assist device 39 attempts to park in the parking lot P1, the relay device 10 compensates for the lack of functions according to the type of the vehicle 18. Therefore, more types of vehicles 18 are parkable.

(2b) For example, when a plurality of vehicles 18 of different types are to be parked in the parking lot P1, in response to an instruction from the parking assist device 39 of the third type, the relay device 10 generates a command for the third type and a command for the second type. Then, the relay device 10 transmits the third type command to the third type vehicle 18 and transmits the second type command to the second type vehicle 18.

3. Other Embodiments

While the present disclosure has been described with reference to the embodiments, it is to be understood that the present disclosure is not limited to those embodiments, but is implementable in various modifications.

(3a) In the above embodiment, only one relay device 10 is provided. However, the present disclosure is not limited thereto. For example, the relay device 10 may be provided for each of the parking lots P1, P2, P3. The relay device 10 may be located on the cloud, or may be located in any one of the parking lots, or in the parking lots P1, P2, and P3 for each of the parking lots P1, P2, and P3. When the relay device 10 is provided for each of the parking lots P1, P2, P3, it may be configured that each relay device 10 can only control the vehicles 18 located in the associated parking lots P1, P2, P3 among the plurality of vehicles 18.

(3b) Multiple functions of one element in the described above embodiment may be implemented by multiple elements, or one function of one element may be implemented by multiple elements. Further, multiple functions of multiple elements may be implemented by one element, or one function implemented by multiple elements may be implemented by one element. Further, a part of the configuration of the above embodiment may be omitted. Further, at least part of the configuration of the above-described embodiment may be added to or replaced with the configuration of another embodiment described above.

(3c) In addition to the parking assist systems 1 and 2 described above, (i) each device such as the relay device 10, the parking assist device 39, the vehicle 18, and the like, which are components of the parking assist systems 1 and 2, (ii) a program for causing the computer to function as each of the above, (iii) a non-transitory substantive storage medium such as a semiconductor memory storing the program, (iv) a parking assist method, (v) a relay method, and the like are also encompassed within the scope of the present disclosure.

What is claimed is:

1. A relay device configured to relay data exchanged between a parking assist device, which is configured to perform parking assist, and a vehicle, which is configured to receive assist from the parking assist device, wherein among the parking assist device and the vehicle, a data transmission source is a transmitter device, and a data transmission destination is a receiver device, the relay device comprising:

a type determination unit configured to determine a type of received data, which represents data received through wireless communication from the transmitter device;

a replacement transmission unit configured to, when the type of the received data is a preset first type, replace the received data with at least one transmission data conforming to a predetermined communication protocol, which is prepared in advance, according to the type of the received data and transmit the transmission data through wireless communication to the receiver device; and a transfer unit configured to, when the type of the received data is a preset second type, transfer the received data as the transmission data to the receiver device, wherein a request to the receiver device is set as the preset first type, data other than the request to the receiver device is set as the preset second type, and the transfer unit is configured to, when the type of the received data is data other than the request to the receiver device, transfer the received data as the transmission data without replacing the received data, wherein when the type of the received data is the preset first type, the relay device causes the receiver device to perform automated valet parking, and when the type of the received data is the preset second type, the transmission data, which has been transferred, causes the receiver device to transmit an acknowledgement response, wherein the relay device further comprises a memory configured to store a command correspondence table that includes a dataset in which a plurality of transmission data are in advance associated with a combination of a type of one received data and type information indicating a type of automated valet parking by the vehicle, and the command correspondence table includes a table that specifies vehicle control instruction to be transmitted by the relay device to the vehicle according to the type information of the vehicle, upon receiving a request from the parking assist device to turn ON function of the automated valet parking.

2. The relay device according to claim 1, wherein at least one of the replacement transmission unit or the transfer unit is configured to, when transmitting the transmission data, convert a communication method of the transmission data into a communication method different from a communication method used for receiving the received data.

3. The relay device according to claim 1, wherein the replacement transmission unit is configured to replace one received data with a plurality of transmission data and transmit the plurality of transmission data to the receiver device, and the relay device further comprising:

an acknowledge transmission unit configured to receive, from the receiver device, a plurality of acknowledges as a response to the plurality of the transmission data, and transmit, to the transmitter device, an acknowledge as a response to the received data upon receiving an acknowledge corresponding to at least the lastly-transmitted transmission data.

4. The relay device according to claim 1, wherein the transfer unit is a first transfer unit, the replacement transmission unit and the first transfer unit are configured to transmit the transmission data to the vehicle based on the received data received from the parking assist device, and the relay device further comprising:

a second transfer unit configured to transfer vehicle data received from the vehicle at a lower frequency than a frequency of receiving the vehicle data.

5. The relay device according to claim 4, wherein the second transfer unit is configured to receive a plurality of vehicle data and transfers an average value of the plurality of vehicle data to the parking assist device.

6. The relay device according to claim 4, wherein the second transfer unit is configured to transfer the vehicle data to the parking assist device without lowering the frequency when the vehicle data includes data of a preset type.

7. The relay device according to claim 4, further comprising:

a vehicle information acquisition unit configured to acquire vehicle information representing at least one of a travel state or a travel environment of the vehicle, wherein the second transfer unit is configured to set the frequency according to the vehicle information and transfer the vehicle data to the parking assist device at the set frequency.

8. The relay device according to claim 1, further comprising:

a type acquisition unit configured to acquire type information representing a type when automated valet parking is performed by the vehicle, wherein the replacement transmission unit is configured to select, according to the type information, a data set in which a plurality of transmission data are prepared in advance, extract, according to the type of the received data, the transmission data from the selected data set, and transmit the extracted transmission data.

9. The relay device according to claim 1, wherein the replacement transmission unit is configured to, when the type of the received data is the request to the receiver device, replace the received data with at least one transmission data prepared in advance according to the type, and transmit the transmission data.

10. The relay device according to claim 1, wherein the parking assist device is a device configured to assist automated valet parking in a parking lot, and the vehicle is configured to perform the automated valet parking.

11. The relay device according to claim 8, wherein the type information represents the parking assist device or the vehicle to which a part of a function, which is to cause the vehicle to perform the automated valet parking, is assigned.

12. The relay device according to claim 11, further comprising:

a vehicle information acquisition unit configured to acquire vehicle information representing at least one of a travel state or a travel environment of the vehicle, wherein the type information represents the parking assist device or the vehicle to which the vehicle information acquisition unit is assigned as the part of the function, which is to cause the vehicle to perform the automated valet parking.

13. A non-transitory tangible storage medium storing instructions of a program to provide, when executed by a computer, a relay device configured to relay data exchanged between a parking assist device, which is configured to perform parking assist, and a vehicle, which is configured to receive assist from the parking assist device, wherein among the parking assist device and the vehicle, a data transmission source is a transmitter device, and a data transmission destination is a receiver device, the instructions comprising:

storing in a memory, a command correspondence table that includes a dataset in which a plurality of transmission data are in advance associated with a combination of a type of one received data and type information indicating a type of automated valet parking by the vehicle, wherein the command correspondence table includes a table that specifies vehicle control instruction to be transmitted by the relay device to the vehicle according to the type information of the vehicle, upon receiving a request from the parking assist device to turn ON function of the automated valet parking, determining a type of received data representing data received through wireless communication from the transmitter device;

replacing the received data with at least one transmission data conforming to a predetermined communication protocol and prepared in advance according to the type of the received data and transmitting the transmission data through wireless communication to the receiver device, when the type of the received data is a preset first type, wherein a request to the receiver device is set as the preset first type and the relay device causes the receiver device to perform automated valet parking; and transferring the received data as transmission data without replacing the received data to the receiver device, when the type of the received data is a preset second type, wherein data other than the request to the receiver device is set as the preset second type and the transmission data, which has been transferred, causes the receiver device to transmit an acknowledgement response.

14. A relay device configured to relay data exchanged between a parking assist device, which is configured to perform parking assist, and a vehicle, which is configured to receive assist from the parking assist device, wherein among the parking assist device and the vehicle, a data transmission source is a transmitter device, and a data transmission destination is a receiver device, the relay device comprising:

a memory configured to store a common correspondence table that includes a dataset in which a plurality of transmission data are in advance associated with a combination of a type of one received data and type information indicating a type of automated valet parking by the vehicle; and a processor configured to determine a type of received data, which represents data received through wireless communication from the transmitter device replace the received data with at least one transmission data conforming to a predetermined communication protocol, which is prepared in advance, according to the type of the received data and transmit the transmission data through wireless communication to the receiver device, when the type of the received data is a preset first type, wherein a request to the receiver device is set as the preset first type and the relay device causes the receiver device to perform automated valet parking, and transfer the received data as the transmission data without replacing the received data to the receiver device, when the type of the received data is a preset second type, wherein data other than the request to the receiver device is set as the preset second type and the transmission data, which has been transferred, causes the receiver device to transmit an acknowledgement response, wherein the command correspondence table includes a table that specifies vehicle control instruction to be transmitted by the relay device to the vehicle according to the type information of the vehicle, upon receiving a request from the parking assist device to turn ON function of the automated valet parking.

15. The relay device according to claim 1, wherein the relay device and the vehicle, which performs the automated valet parking, are configured to communicate wirelessly using either the WebSocket protocol or the Message Queuing Telemetry Transport (MQTT) protocol.

*    *    *    *    *